US008652292B2

(12) United States Patent
Baillargeon

(10) Patent No.: US 8,652,292 B2
(45) Date of Patent: Feb. 18, 2014

(54) CURVED SOLID WOOD BLOCKBOARD AND METHOD FOR ITS MANUFACTURE

(76) Inventor: Yvan Baillargeon, Ste-Hélène-de-Chester (CA)

( * ) Notice: Subject to any disclaimer, the term of this patent is extended or adjusted under 35 U.S.C. 154(b) by 49 days.

(21) Appl. No.: 12/588,422

(22) Filed: Oct. 15, 2009

(65) Prior Publication Data

US 2010/0098895 A1 Apr. 22, 2010

(30) Foreign Application Priority Data

Oct. 15, 2008 (CA) ..................................... 2641628

(51) Int. Cl.
*B32B 1/00* (2006.01)
*B27H 1/00* (2006.01)
*B32B 3/06* (2006.01)

(52) U.S. Cl.
USPC .............. 156/325; 428/58; 428/174; 144/381

(58) Field of Classification Search
USPC ...................... 156/325; 428/58, 174; 144/381
See application file for complete search history.

(56) References Cited

U.S. PATENT DOCUMENTS 413,431 A 10/1889 Bertin et al.
6,418,990 B1 * 7/2002 Lindstrom .................... 144/348
2004/0250912 A1 12/2004 Haller et al.

FOREIGN PATENT DOCUMENTS

DE 10 2006 009161 8/2007
GB 655791 8/1951
SU 251808 11/1970
SU 375180 3/1973
WO 9920443 4/1999

OTHER PUBLICATIONS

Database WPI Week 199332, Thomson Scientific, London, GB, 1993-256244, XP002564502, (Wood Machine Equip) Jul. 30, 1992.

* cited by examiner

*Primary Examiner* — Michael Orlando
*Assistant Examiner* — Daniel Lee
(74) *Attorney, Agent, or Firm* — Goudreau Gage Dubuc; Gwendoline Bruneau

(57) ABSTRACT

The invention allows the realization of parts, longitudinally or transversely curved, of large dimensions, by assembling boards of solid wood side by side, with glue, and to afterward arch the resulting part. The loss of solid wood is then decreased a lot since it is thus possible to assemble several wood boards of various widths together. It allows the realization of final curved parts of almost unlimited dimension, dimension whereas dimensions are usually limited by the width of the sawing, or, in other words, by the thickness of the trees. Here, the limit is situated at the level of the capacity of equipments used to bend solid wood.

7 Claims, 7 Drawing Sheets

CURVED SOLID WOOD BLOCKBOARD AND METHOD FOR ITS MANUFACTURE

FIELD OF THE INVENTION

The present invention relates to folding solid wood blockboard.

BACKGROUND OF THE INVENTION

Curved wood panels are used in backrests for wooden chairs, casket lids, boat shells, and wood furniture, cabinet doors and drawers, to only give some examples. Some curved wood panels, such as the backrests of chairs, are folded on the length of the grain, i.e. longitudinally arched. We can say that other curved wood panels such as casket lids, have boards parallel to the axis of the vault, i.e. are transversely arched.

The production of longitudinally arched wood panels implies folding, or curving, the wood. Curving or folding wood is a delicate operation which requires to master the process and to have a good knowledge of the solid wood properties. The green wood, that is wood freshly cut, is generally easier to curve then the wood which was dried in an oven. The wood can be exposed to vapor, or be immersed in the water, before it is curved to reduce the probability of checking or cracking. Curving the wood can be made by different ways, for example using a custom jig or using a press.

The production of longitudinally arched wood panels implied, until this day, assembling several parts previously curved side by side, by any way, to form a panel. For the transversely curved panels, the machining of at least one edge of each of the wood boards is necessary to give it an angle to assemble the boards, and to assemble them to give them a transversely shaped curve. The radius of the vault is thus predetermined by the angle at which the edges of the wood parts are machined.

Curving or folding solid wood by vapor has allowed so far the use of parts of wood of a single cut, that is, unique parts, which have to have at the onset the wished final dimension. This thus limits the dimension of the possible curved parts and often causes a lot of wood loss.

The known processes of production to obtain curved solid wood panels were satisfactory to a certain extent. However, there is still place for improvement.

SUMMARY

It is possible to obtain a curved panel, using a flat panel composed of boards rectified on their edges and transforming it, by pressing, into a bent panel.

We can also use a bent wood panel fabrication method starting from a flat panel formed of boards glued edge on edge to transform it from a flat panel into a panel bent transversely, longitudinally or bothwise.

We can use a bent wood panel fabrication method starting from a flat panel formed of boards glued edge on edge using a glue resisting to the vapor; this method will allow the use of warm vapor which will increase the flexibility of the wood boards and facilitate the folding of the panel.

We can use a bent wood panel fabrication method starting from a flat panel formed of boards glued edge on edge which have between 8 and 30% of hygroscopic humidity and which are glued using a glue resisting to the vapor, then steaming them during 2 to 60 minutes. This technique allows to fold panels of thickness of ⅛" to 1⅞" and to have a radius larger than 2 inches.

We will be able to bend the panel longitudinally, transversely, or bothwise.

It is also possible to fold panels formed of wood boards assembled in a longitudinal way, a transverse way, or bothwise.

The wood panels can be panels of solid wood.

DETAILED DESCRIPTION

Figure 1:
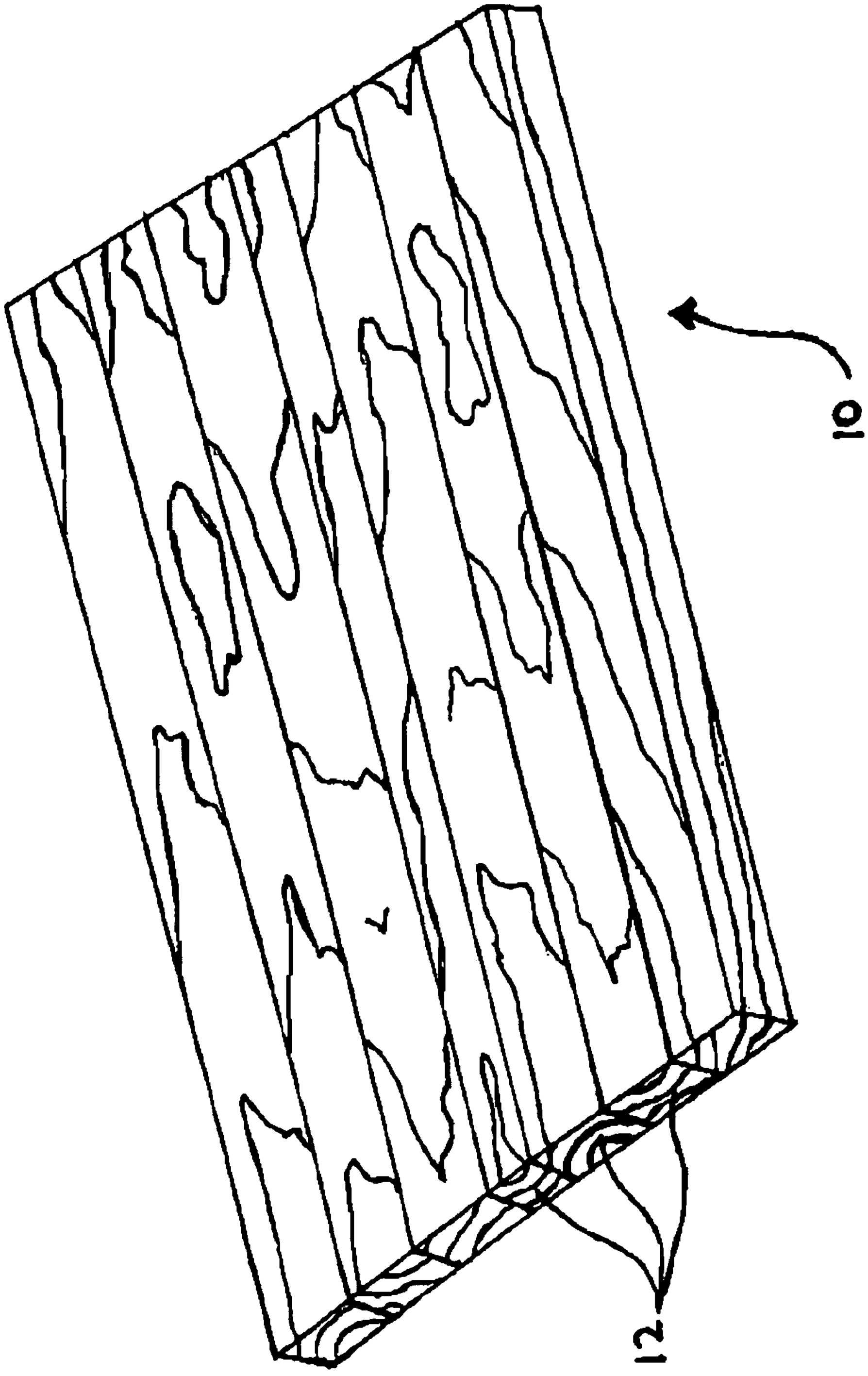
FIG. 1 is a perspective view showing an example of paneling, i.e. a panel of flat solid wood before the folding stage.

In FIG. 1, an example of a panel of side glued boards 10, before it is folded, is shown. It is formed of a number of solid wood boards 12, glued together edge on edge. This type of panel can be folded longitudinally or transversely, for example.

Figure 2:
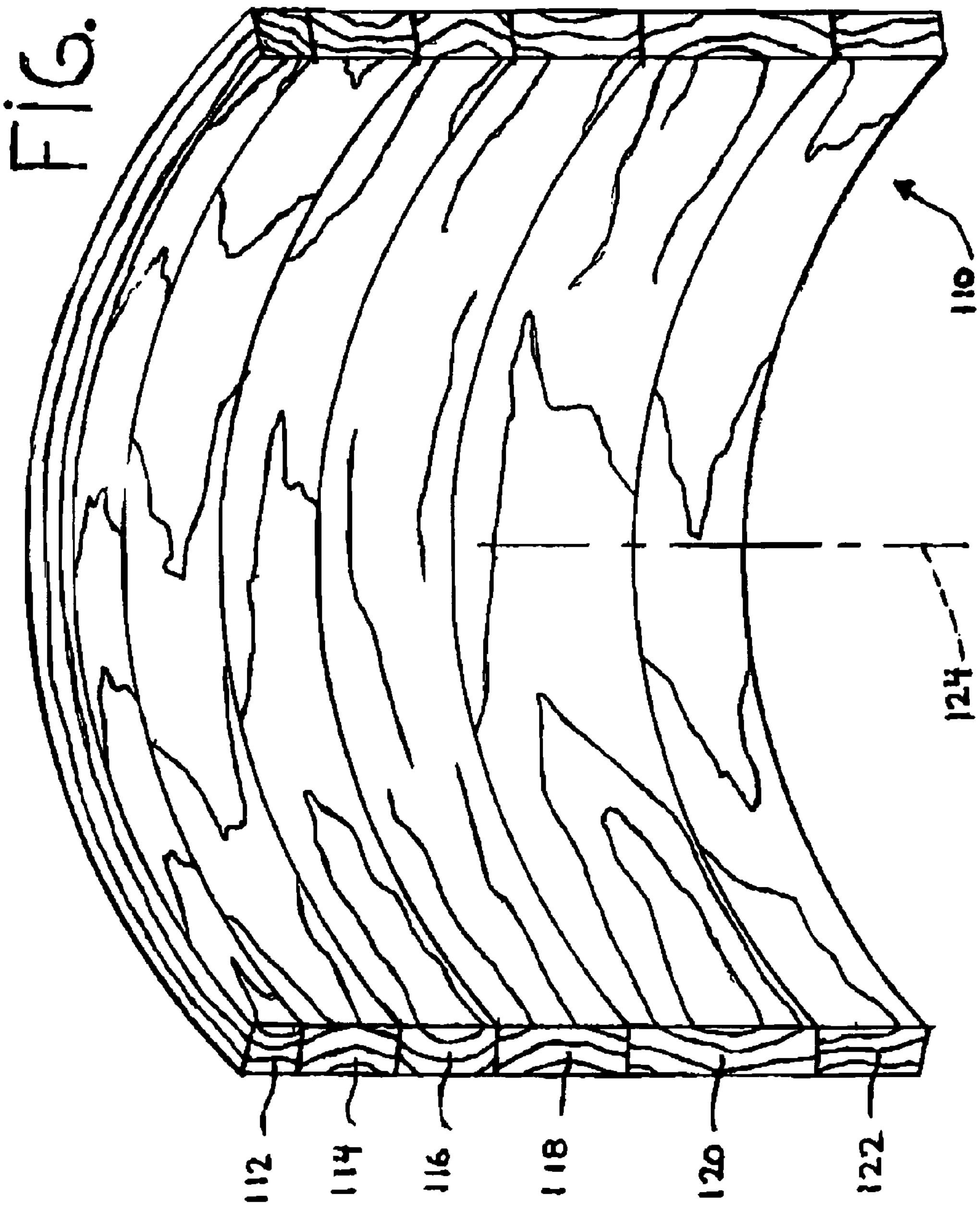
FIG. 2 is a perspective view showing an example of a panel of wood longitudinally arched.

In FIG. 2, an example of a panel 110 bent longitudinally is shown. The panel 110 is formed of 6 full boards 112, 114, 116, 118, 120, 122 of solid wood, which are assembled edge on edge. These boards 112, 114, 116, 118, 120, 122 are folded on their length, around the axis 124, and we can then say that the bent panel 110 is folded longitudinally. This type of panel can be used to make a chair back, for example.

Figure 3:
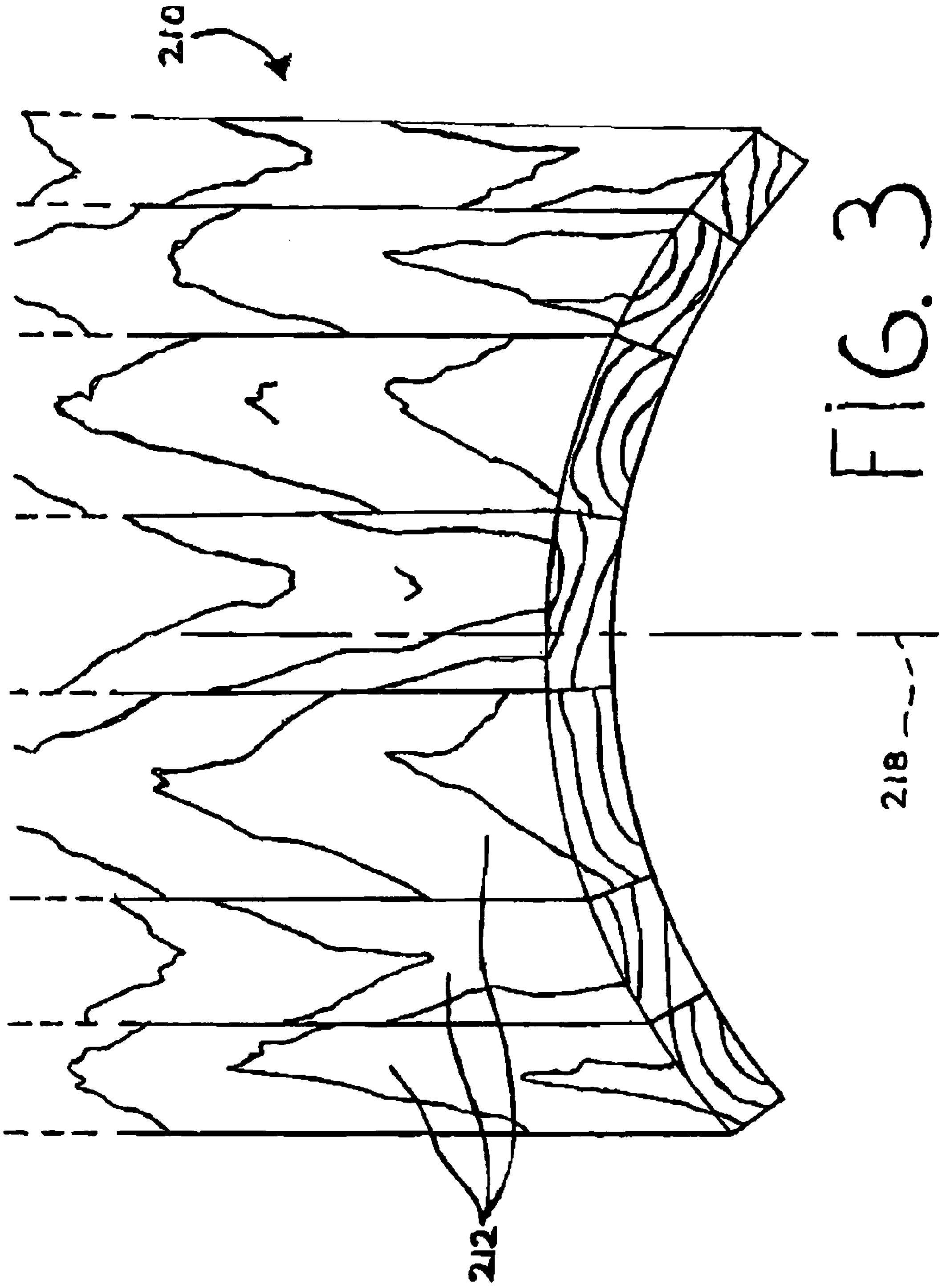
FIG. 3 is a perspective view showing an example of a wood panel transversely bent.

In FIG. 3, an example of a panel 210 bent transversely is shown. It is made of a number of boards 212 in solid wood glued in parallel and oriented along the axis 218. We can thus say that the panel is <<transversely folded>>. This type of panel can be used to make a coffin lid, for example.

Figure 4:
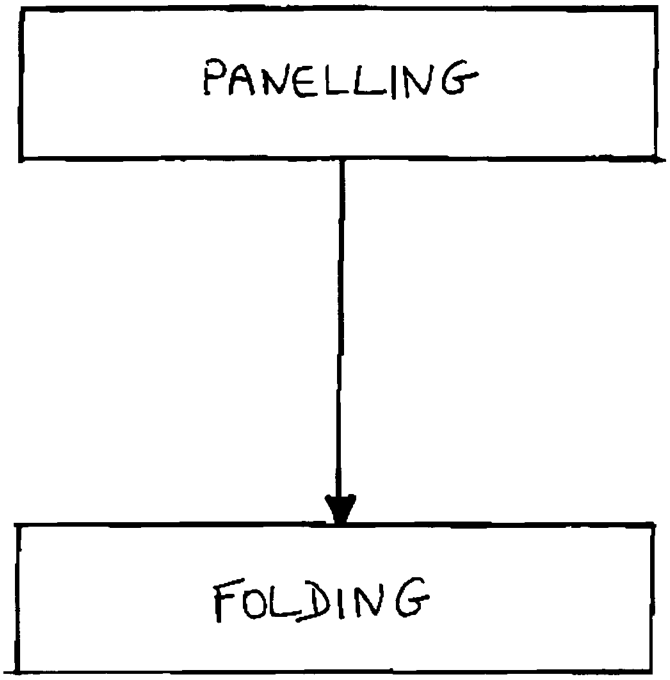
FIG. 4 is an organization chart showing an example of method to obtain a bent panel.

In FIG. 4, we find an organization chart which illustrates the simplified process used to make a panel of boards which will be bent longitudinally, transversely, or obliquely. As illustrated, the stage of folding is performed after the stage of the panelling. During the stage of the panelling, a number of boards is used to assemble the panel by diverse techniques, but it is necessary to make sure that joints are well glued by using an appropriate glue.

Figure 5:
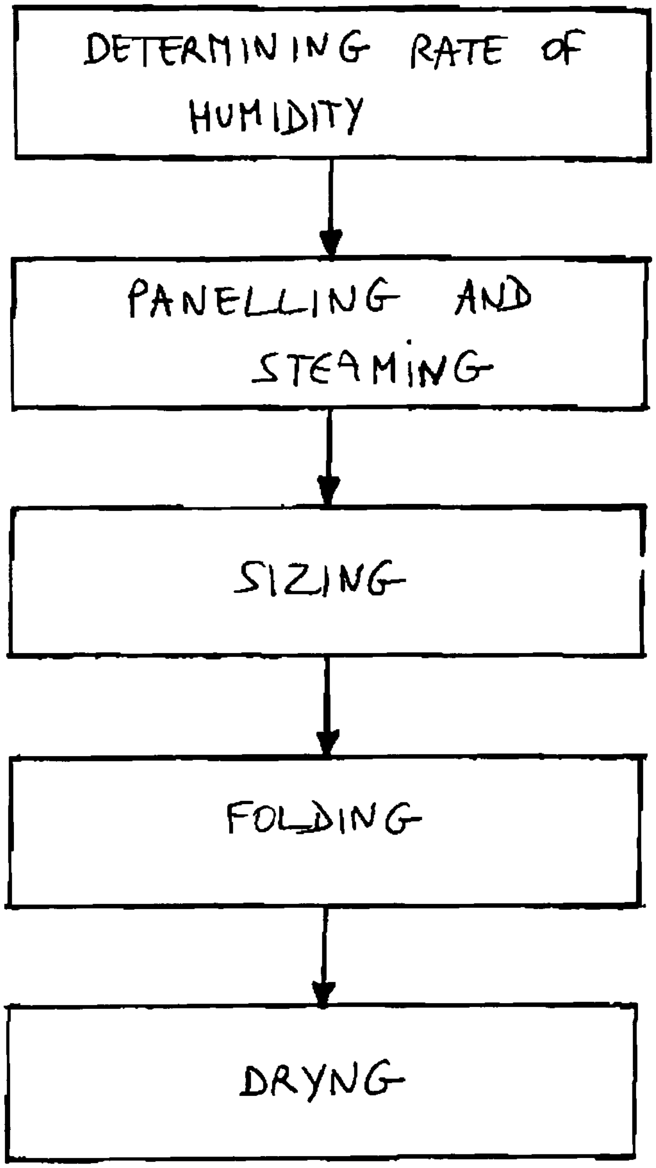
FIG. 5 is an organization chart showing an example of a method to obtain a longitudinally arched panel.

In FIG. 5, we find an organization chart which illustrates the detailed process used to make a panel of boards of solid wood, bent longitudinally.

Figure 6:
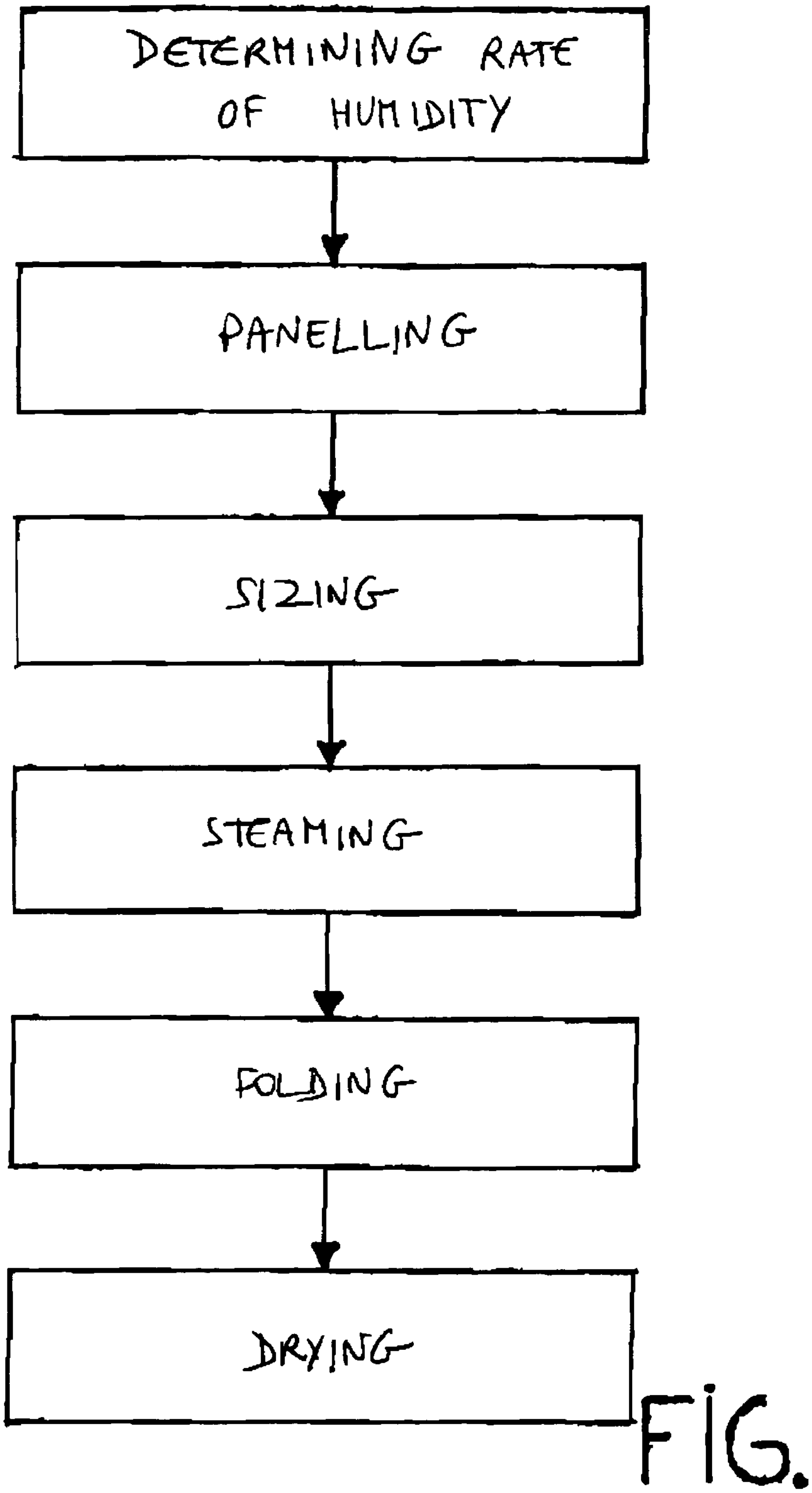
FIG. 6 is an organization chart showing an example of a method to obtain a panel bent transversely.

In FIG. 6, we find an organization chart which illustrates the detailed process used to make a panel of boards of solid wood, bent transversely.

Figure 7:
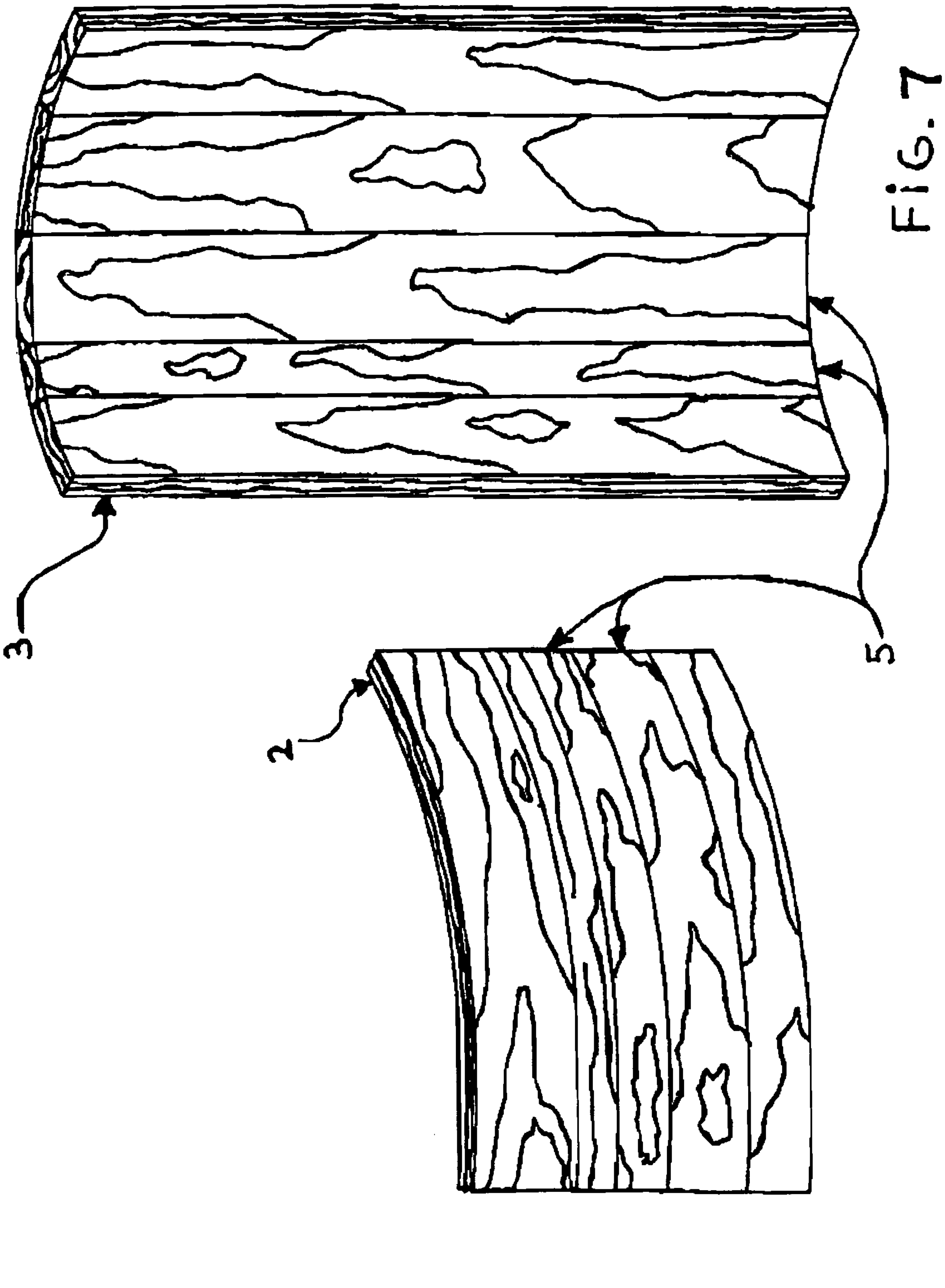
FIG. 7 shows examples of panels of wood longitudinally and transversely arched.

In FIG. 7, examples of panels, bent longitudinally 2 and transversely 3 respectively, are shown. They are each formed of a number of boards 5.

A set of tests was so made to validate the principle of the longitudinally folding and of the transverse folding. For each of the tests, panels were curved using a similar process. Each of the tests was realized according to the processes illustrated in FIG. 5 or 6, depending if it is a longitudinal or transverse bending. Variables in the general process were brought from one test to the other one, such as represented in the following tables, to obtain the best result.

| Tests for longitudinally folding | | | | | | | |
|---|---|---|---|---|---|---|---|
| No. of test | TH % Wood Humidity | Species of the wood | Steaming (Min.) | Compression when folding | Radius of the curve (inches) | Type of press used | Glue used |
| 1 | 25-30 | Yellow birch | 15 | No | 23 | Heating trays | Linestar 4610 (Nacan) |
| 2 | 25-30 | Yellow birch | 30 | No | 23 | Heating trays | Pur-Feet Lok (Nacan) |
| 3 | 12-16 | Yellow birch | 15 | Yes | 23 | High frequency | Purbond HB-222 (Nacan) |
| 4 | 12-16 | Yellow birch | 15 | Yes | 6 | Folding tables | MUF 400 (Tembec) |

For the longitudinal bending, the general process used in each of the 4 tests is represented in FIG. 5. The method includes the use of a series of boards of yellow birch, let to dry naturally in air, having a thickness of 4/4 and a variable width. The category of the boards of yellow birch is "select, SAP", having a pale face (face free of heartwood). During each test, randomly selected boards were tested to obtain their level of hygroscopic humidity (TH %), to obtain the rate of humidity of the boards used in the making of panels for each of the 4 tests. This initial humidity is also indicated in the above Table.

During the stage of panelling, each panel is made by gluing a variable number of boards of varied widths edge on edge with the glue indicated in the above Table. It is good to note that all the panels are flat after they are glued, before being curved. The panels are glued directly in the steaming room. The heat, 85-90 degrees Celsius, in the steaming room, contributed to harden the glue during the steaming stage of 15 or 30 minutes depending on the test. A total of about ten panels were made for each test.

The panelling was followed by a panel sizing stage. Panels were trimmed at 13/16 inch and cut at a precise length to fit to the compression steel sheet when such a device is used.

Each panel was then folded in a hydraulic press on a mould. The type of press used is indicated in the above Table. When a compression steel sheet was used during the folding step, it is also indicated in the column "compression when folding" in this Table.

The folded panels were, afterward, let to dry naturally, in normal atmospheric situation (hygroscopic balance from 6 to 8%).

The folded panels were then inspected to verify the condition of the glued joints, the appearance of the panels, both on the concave and on the convex faces. The results of this inspection for each test appear in the Table presented below.

| RESULTS OF THE TEST FOR LONGITUDINALLY FOLDINGS | | | |
|---|---|---|---|
| No. tests | Condition of the glued joints after the folding | Quantity of good panels in % (note 1) | Comments |
| 1 | Approximately 30% of joints partially gave in when folded | 0% | Some glued joints remained intact on all the length |
| 2 | Approximately 50% of the glued joints partially gave in when folded | 0% | Some glued joints remained intact on all the length |
| 3 | The glued joints remained intact on the concave face. On the convex face, we find, on the bad panels, small openings. | 85% | Use of a compression steel sheet |
| 4 | The glued joints remained intact on the concave face. On the convex face, we find, on the bad panels, small openings in the center of the curvature. | 70% | Use of a compression steel sheet |

(Note 1)
A panel is considered as good when the joints of glue remained intact, without opening on the concave and convex face of this one after the folding and the final drying.

| Tests for transversally folding | | | | | | | |
|---|---|---|---|---|---|---|---|
| No. of test | TH % Wood Humidity | Species of the wood | Steaming (Min.) | Compression when folding | Radius of the curve (inches) | Type of press used | Glue used |
| 1 | 25-30 | Yellow birch | 30 | No | 23 | Heating trays | Linestar 4610 (Nacan) |
| 2 | 25-30 | Yellow birch | 30 | No | 23 | Heating trays | Pur-Feet Lok (Nacan) |
| 3 | 25-30 | Yellow birch | 15 | No | 23 | High Frequency | Purbond HB-222 (Nacan) |
| 4 | 12-16 | Yellow birch | 15 | Yes | 18 | High Frequency | Purbond HB-222 (Nacan) |

For the transverse folding, the general process used in each of 4 tests is represented in FIG. 6. The method includes the use of a series of boards of yellow birch let to dry naturally at the air, having a thickness of 4/4 and a variable width. The category of the boards of yellow birch is "select, SAP", with a pale face (face free of heartwood). During each test, boards selected randomly were tested to obtain their level of hygroscopic humidity (TH %), to so obtain the rate of humidity of the boards used in the making of panels for each of the 4 tests. This initial humidity is also indicated in the above Table.

During the stage of panelling, each panel is made by gluing a variable number of boards of varied widths, edge on edge, with the glue indicated in the above Table. The panels are glued in a spider-type press. It is good to note that all the panels are flat after being glued, before being curved. The time it takes for the glue to dry and harden is according to the manufacturer's data sheet of the glue used. A total of about ten panels were made for each test.

The panelling is followed by a stage of panel sizing. Panels were trimmed at 13/16 inch and cut to a precise width to fit to the compression steel sheet when used.

Every panel was treated with vapor with a free steam steaming pit. This operation was made at 85-90 Celsius degrees for 15 or 30 minutes depending on the test.

Each panel was then folded in a hydraulic press on a mould. The type of press used is indicated in the above Table. When a compression steel sheet was used during the folding, it is indicated in the column "compression when folding", also in this Table.

The folded panels were left, afterward, to dry naturally, in normal atmospheric conditions (hygroscopic balance from 6 to 8%).

The folded panels were inspected to verify the condition of the joints of glue, the appearance of panels, both on the concave face and on the convex face. The results of this inspection for every trial appear in the Table presented below.

| RESULTS OF THE TESTS FOR TRANSVERSALLY FOLDINGS | | | |
|---|---|---|---|
| No. tests | Condition of the glued joints after the folding | Quantity of good panels in % (note 1) | Comments |
| 1 | All the glued joints remained intact on the concave and convex faces. | 100% | |
| 2 | The majority of the glued joints remained intact on the concave and convex faces | 75% | |
| 3 | All the glued joints remained intact on the concave and convex faces. | 100% | |
| 4 | All the glued joints remained intact on the concave and convex faces. | 100% | Use of a compression steel sheet |

(Note 1)
A panel is considered as good when the joints of glue remain intact, without opening on the concave and convex faces after the folding and the final drying steps.

A compression steel sheet has for objective to prevent the stretching of the wood fiber on the convex face of the piece of wood or the panel to bend. On both extremities of the steel sheet, we find a stop plate; the panel is then cut in a precise dimension at the exact distance between these two stop plates. In the stage of the folding, the steel sheet follows the panel in the press until the final shape.

In conclusion, the more the radius of curvature is small, the more it is recommended to use a compression steel sheet. The radius of curvature is influenced by the thickness of the wood to be folded: the greater the thickness of the wood is, the greater the radius of curvature must be. Every panel was folded with a hydraulic bending press. The folded panels were, afterward, let to dry naturally, in normal atmospheric conditions (hygroscopic balance from 6 to 8%).

The deformation produced on the bent panels, after drying, is very small. A recovery occurred on the folded panels, but no more than what is normally foreseen for a unique part, that is, without being glued. A very interesting fact is that the folding of a glued wood panel tolerates some defects that the folding of individual parts would not accept at the risk of breaking during the folding step. For example, knots and wood with an oblique thread support the effect of the folding when these parts are glued together. Given that these defects are not often found facing one another, boards exempt of defects support those who do have defects. We can thus expect a better and bigger use of wood resources.

It is normally easier to fold a panel transversely than longitudinally. During a longitudinal folding, the joints of glue are subjected to important longitudinal shears. On the other hand, during a transverse folding, the effort acts between the fibers of the wood rather than on the length of the wood fibers, and the effort on the joints of glue is mainly felt by the tension between the wood boards.

The experiments above described demonstrate that the folding of panels made of solid wood boards is doable and gives satisfactory results while allowing the recovery of the wood, transversely as well as longitudinally. These results imply that the oblique folding of the panels is as well doable because to bend obliquely is the combination of a transverse and longitudinal folding.

If we try to make a folded panel using individual boards then assembled together, the uneven recovery of each individual board will result in panels of uneven surfaces. The radius of the folding of each board can be uneven and the panel which will result will have to be worked on again to obtain a satisfactory product.

Trimming the panel flat on its thickness, before folding it, is much simpler and will require no additional operation after the folding, except a light sanding.

Folding the panel, rather than folding individual boards and assembling them afterwards, can save a considerable quantity of time and decrease a lot the wood loss, given that the glued boards can be of varied widths, even narrow. This can eliminate operations which do not contribute to added value and allows new applications. For example, chair backs, which were usually made with a unique part, can now be made with a glued panel. Panels bent of bigger dimension can also be made, because the panelling allows a lot of flexibility in the size of the finish parts, simply by assembling more or less boards together.

In the case of panels folded transversely, the folding of the panel can advantageously save the step to have to manufacture an angle on the edges of the components. In other terms, assembling a flat panel then folding it can be realized in a short time, according to a process simpler than assembling boards with angular edges and, afterward, gluing them in a mould, and leveling them respecting the target curvature.

Besides the examples above-mentioned in this document, several other alternatives can be considered.

For example, although the examples described above apply to panels folded regularly on their entire surface, it is as well possible to bend only part of the surface.

The folding of the panel can be made with other appropriate tools. For example, the use of rollers rather than a press can be suited in certain situations.

An appropriate choice of glue plays an important role to prevent the appearance of faults in the joints of glue. The glue should be able to resist heat and humidity to which the panel is exposed during the steaming, and should also be able to resist the folding operation. Adequate glue can be polyurethane glue, melamine containing some formaldehyde urea with a catalyst, a white glue of PVA type with a catalyst, to give only some examples. Certain glues must be avoided. In particular, the outside glue PVA of Lepage™, as well as the white glue PVA without catalyst is not suited, at least in some applications.

Hard wood indicated as broad-leaved trees generally give better results than conifer. Wood such as the African mahogany and the eucalyptus or lyptus is to be avoided. The wood species advisable is the wood which we use normally in panelling and industrial folding. For some applications, we can begin the process with already dry wood, dried with a dryer, rather than to use wood naturally dried in air.

After the folding, panels can finish to dry freely, at ambient air, or in an artificial dryer with controlled heat and humidity.

Panels made of solid wood boards having a hygroscopic humidity comprised between 8 and 30% and between ⅛ and 1⅞ inch of thickness, were bent after having been warmed in vapor for between 2 and 60 minutes before the folding and having a radius of curvature higher to 2 inches, for example.

This new way of making opens nice perspectives in the technical and economic point of view for the manufacturers of curved articles, such as wood sport articles, backrests of chairs or cabinet doors and drawers, in solid wood, for example.

What is claimed is:

1. A process for producing a curved wood piece having a desired radius of curvature and a desired direction of curvature longitudinally, transversely, or in oblique, comprising:

a) selecting at least two boards of solid wood of the same thickness, to reach a hygroscopic humidity between 8 and 30%;

b) assembling the at least two boards of solid wood into a flat panel with glue;

c) in a steaming room, steaming the panel and hardening the glue;

d) folding the flat panel according to the desired radius of curvature and the desired direction of curvature longitudinally, transversely, or in oblique; and e) drying the obtained curved piece of wood;

wherein the boards are selected among boards of a same width, boards of different widths, boards of a same wood species, and boards of different wood species; and wherein said step d) of folding is made longitudinally, transversely, or in oblique, on at least one part of the surface of the panel.

2. The process according to claim 1, wherein said assembling at least two boards comprises gluing said boards according to at least one of: i) edge on edge and ii) face against face.

3. The process according to claim 2, said gluing comprising using a glue resistant to the temperature and to the humidity of said steaming, and said glue being able to resist said folding operation d).

4. The process according to claim 3, the glue being one of: polyurethane glue, melamine glue containing formaldehyde urea with a catalyst, and a white glue of PVA type with a catalyst.

5. The process according to claim 1, wherein said folding of the panel is made according to one of: i) in a curving press on a mold and ii) with rollers.

6. The process according to claim 5, wherein said folding of the panel is made in a curving press being one of: i) a press with heating trays, ii) a high-frequency press and iii) a press with folding tables.

7. The process according to any of claims 1 to 6, 3 and 4, including sizing of the panel.

* * * * *